Aug. 12, 1930.  T. KOLLINEK  1,772,813
BRAKE APPARATUS FOR AIRCRAFT
Filed Dec. 3, 1928  2 Sheets-Sheet 1
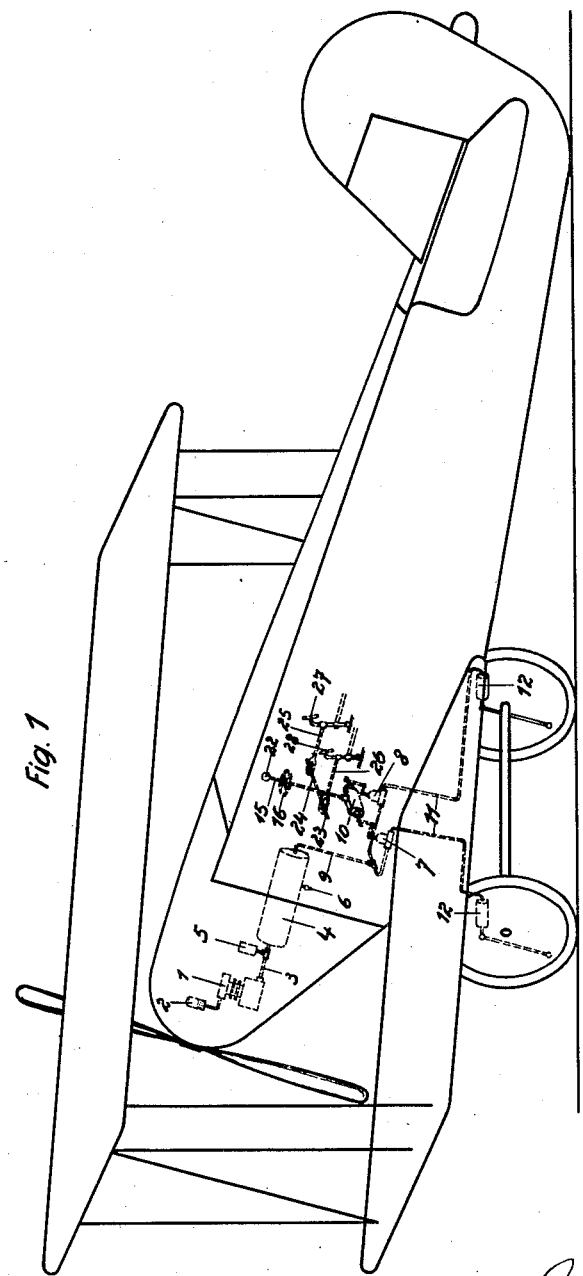

Aug. 12, 1930.        T. KOLLINEK        1,772,813
BRAKE APPARATUS FOR AIRCRAFT
Filed Dec. 3, 1928        2 Sheets-Sheet 2
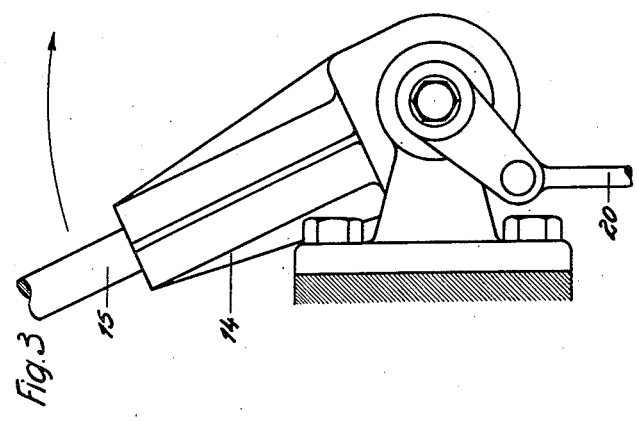
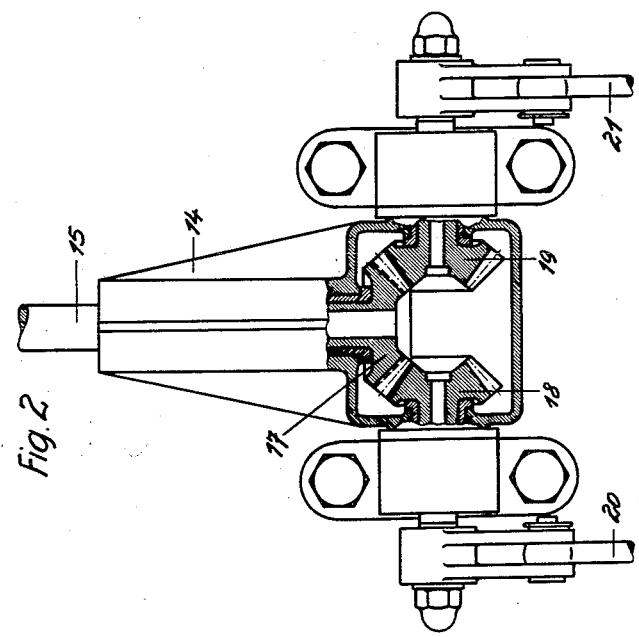

Patented Aug. 12, 1930

1,772,813

UNITED STATES PATENT OFFICE

THEODOR KOLLINEK, OF BERLIN, GERMANY, ASSIGNOR TO KNORR-BREMSE A. G., OF BERLIN, GERMANY, A CORPORATION OF GERMANY

BRAKE APPARATUS FOR AIRCRAFT

Application filed December 3, 1928, Serial No. 323,393, and in Germany August 17, 1928.

An object of this invention is to provide improved means for the application of brakes to the wheels of aircraft when running on the ground. Another object is to facilitate the use of the brakes in the steering of the aircraft when running on the ground. Other objects and advantages of the invention will appear from the following description read in conjunction with the accompanying drawings, wherein:—

Figure 1 represents in perspective an aeroplane exemplifying this invention.

Figure 2 is an elevation partly in section of a portion of the brake actuating gear.

Figure 3 is a side elevation of the gear shown in Figure 2.

Hitherto the steering of the free running aeroplane has been effected exclusively by the side rudders, which were actuated by steering pedals. In order to relieve the pilot, who is much occupied, especially in landing, steering by means of the brakes is, in this invention, combined with the actuating of the side rudders. For this purpose the steering pedals of the side rudders are connected in such manner with the arms on the hand lever or shaft for the bevel wheel drive, that when the brake is not applied, the movement of the pedals controlling the side rudders cannot cause any braking action, whereas, when the brakes are set to act on landing, every movement of the pedals controlling the side rudders is transmitted to the brake apparatus to cause a one-sided braking of the under-carriage, thus supplementing the steering action exerted by means of the side rudders.

A compressor 1 driven by the aeroplane engine takes in atmospheric air through the aspirator or suction cap 2, and forces it through the pipe 3 into the reservoir 4. A safety valve 5 is fitted on the pipe 3 of the reservoir 4, which valve allows the escape of any further compressed air supplied thereto after a fixed pressure has been reached. Instead of a safety valve, a pressure regulator of known construction may be fitted, which automatically switches the compressor to discharge when the desired high pressure has been reached. A nozzle 6 fitted on the reservoir 4 serves for the inflation of the tyres. The distributing valves 7 and 8 are connected to the reservoir 4 by means of the pipe 9. The driving gear indicated generally at 10 in Figure 1 serves to operate the distribution valves, which are of a known type, and from which the pipes 11 lead to the brake cylinders 12. The driving gear more clearly shown in Figures 2 and 3 comprises a casing or housing 14, in which is mounted an operating shaft or spindle 15 which can be rotated by means of the hand wheel 16, or can be swung by the knob 22 (Figure 1). The shaft 15 carries a bevel wheel or pinion 17 which engages with the bevel wheels or pinions 18 and 19 mounted in the casing 14. On the axes of the bevel wheels 18 and 19 are fitted the levers 20 and 21, which actuate the spindles of the distribution valves 7 and 8. On the shaft 15 are lateral arms 23, 24 adapted to be engaged by rods 25 and 26 in link connection with the pedals 27 and 28 of the side rudders. The engagement of the lateral arms or projections 23 and 24 with the ends of the rods 25 and 26 is preferably effected by forked or slotted ends on the said rods.

The method of operation is as follows:—

For the purpose of an equal application of the brakes and a consequent straight running course of the aeroplane, the knob 22 with the shaft 13 is swung as indicated by the arrow in Figure 3. The housing 14 is thus rotated about its pivotal bearings and the bevel wheels 18 and 19 rotate in the same direction; the distributing valves 7 and 8 are thereby both influenced in the same sense and allow the same amount of compressed air to enter the brake cylinders 12.

In order to steer the aeroplane the hand wheel 16 is rotated, in an approximately horizontal plane, when the two bevel wheels 18 and 19 are moved in opposite directions and the distributing valve 8 is for example actuated in the sense of a stronger brake action and the distributing valve 7 in the sense of a reduced action, or in the maintenance of the original brake action.

If on landing the brakes are applied by means of the actuating knob 22, then the arms 23 and 24 rest at the inner ends of the slots in the rods 25 and 26. Any movement of the pedals of the side rudders then causes a rotation of the shaft 15 and a steering of the aeroplane in the manner above described, without the use of the hand wheel 16 being necessary to rotate the shaft.

When the brakes are not applied by the knob 22 any movement of the pedals 27 and 28 displaces the rods 25 and 26 on the arms 23 and 24, without carrying these arms with them, and in this case the steering by the side rudders has no effect on the brake apparatus.

Instead of rods provided with slots, any equivalent means of transmitting the movement of the rods 25 and 26 to the actuating gear of the brakes may be used. For example the rods 25 and 26 may engage each in one limb of an angle lever rotatable about its apex, the other limb of which lever, on the application of the brakes, comes within reach of the arms on the shaft 15.

What I claim and desire to secure by Letters Patent of the United States is:—

1. In brake apparatus for aircraft having ground wheels, air brakes adapted to act unevenly on said wheels, a swinging shaft having transverse arms adapted to be rotated to control the operation of said brakes, a plurality of pedals, and normally inoperative connections between said pedals and said arms, said connections becoming operative to rotate said shaft only when said shaft has been swung into an operative position and has thereby placed said arms within the effective reach of said connections.

2. An aircraft having side steering rudders controlled by pedals and also having ground wheels, air brakes adapted to act on said wheels to co-operate in steering the aircraft when on the ground, distributing valves controlling said air brakes, a shaft adapted to be rocked by hand into such a position as to apply the brakes, and connections between said pedals and said shaft inoperative except when the shaft is in the said position, said connections then operating to rotate said shaft to effect an uneven application of the brakes to steer the aircraft.

3. In an aircraft having ground wheels, air brakes adapted to act unevenly on said wheels to steer the aircraft when on the ground, a rotatable shaft to control said brakes, a plurality of pedals, slotted links operable by said pedals, and transverse arms on the shaft freely movable in the slots of said links, said shaft being pivotally movable to enable the links to come into effective engagement with said arms to rotate the shaft.

THEODOR KOLLINEK.